E. E. PATTEN.
ADDING MACHINE.
APPLICATION FILED MAR. 12, 1914.

1,153,820.

Patented Sept. 14, 1915.
9 SHEETS—SHEET 7.

Fig. 7.

Witnesses:
J. Adolph Bishop.

Inventor:
Elmer E. Patten,
Atty.

E. E. PATTEN.
ADDING MACHINE.
APPLICATION FILED MAR. 12, 1914.

1,153,820.

Patented Sept. 14, 1915.
9 SHEETS—SHEET 9.

Fig. 9

Witnesses
Wm. Janus
C. J. Butler

Inventor,
Elmer E. Patten,
By F. C. Donwalt. Atty.

UNITED STATES PATENT OFFICE.

ELMER E. PATTEN, OF ST. LOUIS, MISSOURI, ASSIGNOR TO LEO RASSIEUR, JR., TRUSTEE.

ADDING-MACHINE.

1,153,820. Specification of Letters Patent. Patented Sept. 14, 1915.

Application filed March 12, 1914. Serial No. 824,102.

*To all whom it may concern:*

Be it known that I, ELMER E. PATTEN, a citizen of the United States, residing at the city of St. Louis, State of Missouri, have invented a certain new and useful Improvement in Adding-Machines, of which the following is a full, clear, and exact description, such as will enable others skilled in the art to which it appertains to make and use the same, reference being had to the accompanying drawings, forming part of this specification, in which—

Fig. 3 is a section showing the carriage stepped over in front of the accumulators. Fig. 3ᵃ is a detail illustrating the key lever locking mechanism. Fig. 4 is a section on line 4—4 of Fig. 1. Fig. 4ᵃ is a detail showing a back view of the carriage denominational stops. Fig. 5 is a view of the left hand side of the machine taken on the line 5—5 of Fig. 7. Fig. 5ᵃ is a detail fragmentary plan of the error key lever. Fig. 5ᵇ is a detail showing a partial top view of the register rock plate. Fig. 6ᵃ is a front elevation of the total key. Fig. 8 is a top view showing the ribbon and paper handling mechanism. Fig. 8ᵃ is a detail plan view of the carriage shifting mechanism. Fig. 8ᵇ is a detail showing the side view of ribbon feeding mechanism.

My invention relates to an item listing and adding machine of the ten-key type in which the items are set up in segments carried on a movable carriage, the carriage being stepped leftwardly as each digit is inserted, into position for the segments to engage the accumulators when the handle is pulled. The segments of the movable carriage are controlled in the setting-up operation by stationary stops operated by the keys, a stop corresponding to the numerical value of the key depressed being raised into position to limit the movement of the segment in which the digit is to be inserted. The segments carry printing type which are moved into printing position by the movement of the segments when the digits are inserted, and by the leftward stepping over of the carriage.

The specific features to which my invention relates are, an improved item carriage, an improved setting mechanism, an improved denominational stop mechanism for the item carriage, an improved printing mechanism, and improved interlocking mechanisms for the various operating keys and actuating shaft of the machine.

The principal object of my invention is to simplify the construction of such machines by providing a mechanism containing comparatively few parts, nearly all of which may be stamped out of sheet metal.

A further object of my invention is to decrease the amount of metal in movement of the various operations, and to provide a machine in which all of the manipulative operations are light and rapid.

A further object of my invention is to provide a practical and efficient adding and listing machine of small size and weight.

These various objects are attained by a novel and improved construction and arrangement of parts as hereinafter set forth.

Figure 1:
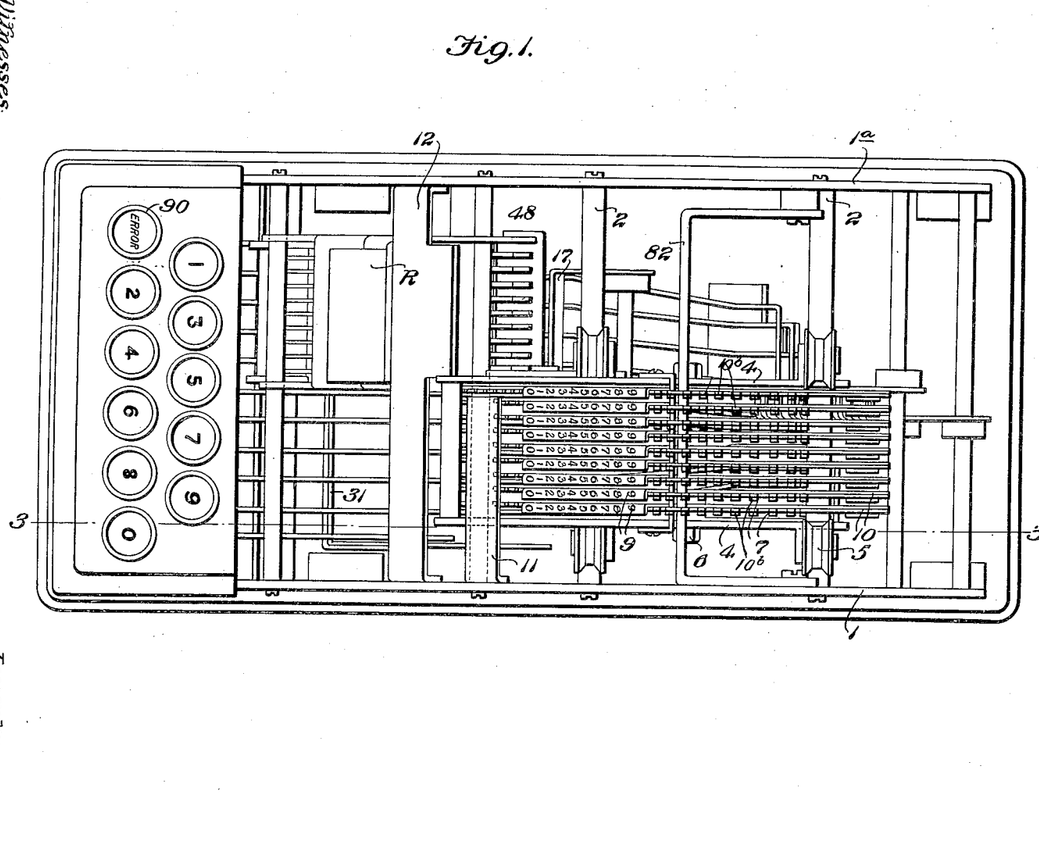
Figure 1 is a top view of the machine with ribbon and paper handling mechanism removed.
Figure 2:
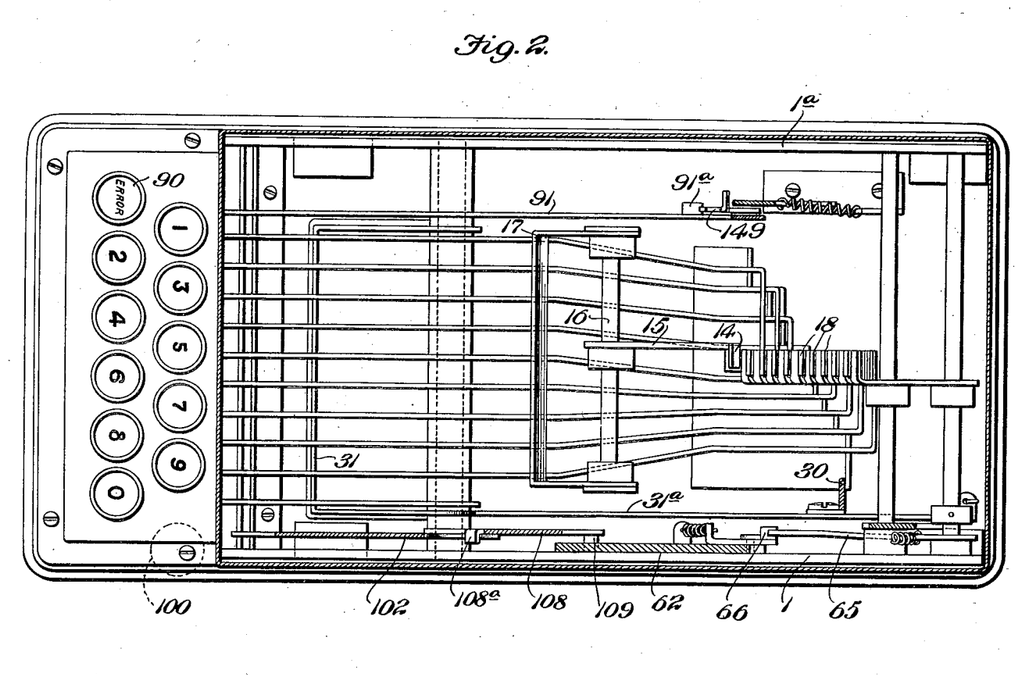
Fig. 2 is a top view with everything above the stops removed.

*The segments and segment carriage.*—Referring to Fig. 1, 1 represents the right hand side frame, and 1ᵃ the left hand side frame. 2 are track bars mounted therein. 4 are the side frames of the segment carriage which are mounted on the track bars by rollers 5. On a shaft 6 mounted in the carriage side frames 4 are pivoted the segments 7, one of which is shown in side elevation in Fig. 3. The segments have the teeth 8 which coöperate with the accumulators, a dial or indicating portion 9 on each of which are numbers from 1 to 0 and which are visible through a slot S in the casing, and the type carriers 10 which are pivoted on the segments at 10ᵃ and carry printing types 10ᵇ. The segments are revoluble on shaft 6, and by their revolution the teeth 8 are positioned relative to the accumulators, the numbers on dial 9 relative to the sight opening S, and the types 10ᵇ relative to the printing line. The carriage is shown in its normal or starting position in Fig. 1, in which position it is at the right of the register section R. A lock bar 11 is secured to the side frame 1 and engages between two of the teeth 8 on the segments to hold the segments in zero position. Pivoted in the frame is a movable lock bar 12 which is disposed over the register section and which engages between two of the teeth of a segment to hold the segment in its set position. Between the left hand end of lock bar 11 and the right hand end of lock bar 12, there is a space in which the segment is not engaged by either. When the segment is in this space, it is held at zero position by the intermediate stop 14 which is carried on a lever 15 pivoted at 16 and universally operable from all of the number keys, except the zero key, by a universal bar 17. This intermediate stop 14 is the zero stop, and in passing from the control of lock bar 11 into the control of stop 14, the segments will be retained in unset or zero position. Extending rearward of zero stop 14 are the digit stops 18 each under control of a key. When in normal position, these stops 18 lie below the path of movement of the depending lugs 19 of the segments, but depression of a key raises a stop 18 so that it will be in the path of the lug 19 of the segment which is being set, and stop the segment when it has rotated to the distance indicative of the digit to be set up. It will be understood that as the number key is depressed to raise one of the stops 18, the intermediate stop 14 is withdrawn because of its universal bar connection with the key levers, and hence the segment upon escaping from the control of zero stop 14 will be rotated to the extent permitted by the number stop raised. This positioning of number stop 18, withdrawal of intermediate stop 14, and revolution of the segment so that the segment passes from control of zero stop 14 into engagement with a number stop, takes place upon the downward movement of a key. Upon the upward movement of the key, the set segment is shifted from the setting zone into engagement with locking bar 12 and the next segment shifted from control of locking bar 11 into control of zero stop 14. Thus it will be seen that in the setting operation a segment is shifted out of engagement with lock bar 11, into engagement with zero stop 14, then into engagement with the selected key operated stop, and then into engagement with locking bar 12, where it lies in front of an accumulator wheel. The setting of a digit in the next segment steps the first segment from in front of the units accumulator wheel to in front of the tens accumulator wheel and so on. This is the setting operation, and auxiliary to it are the number key full stroke, the escapement and the segment throwing operations.

Figures 5, 5A, 5B:
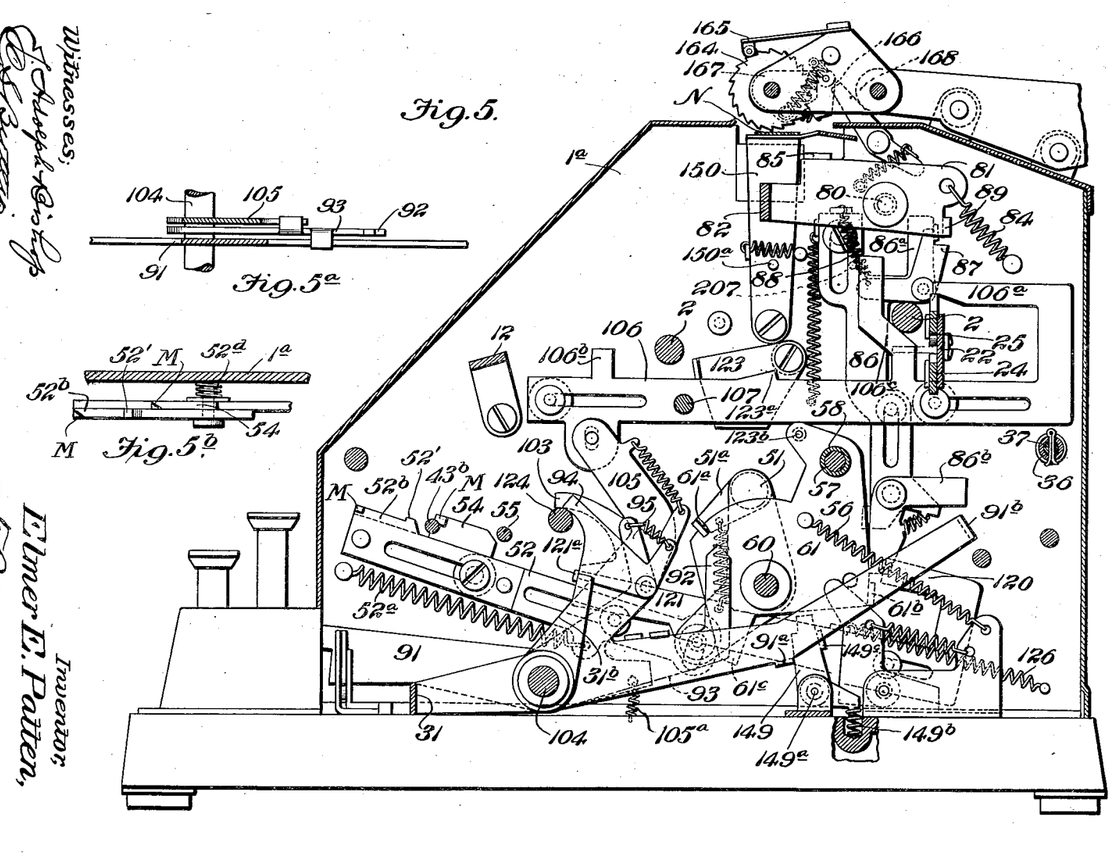
Figure 6:
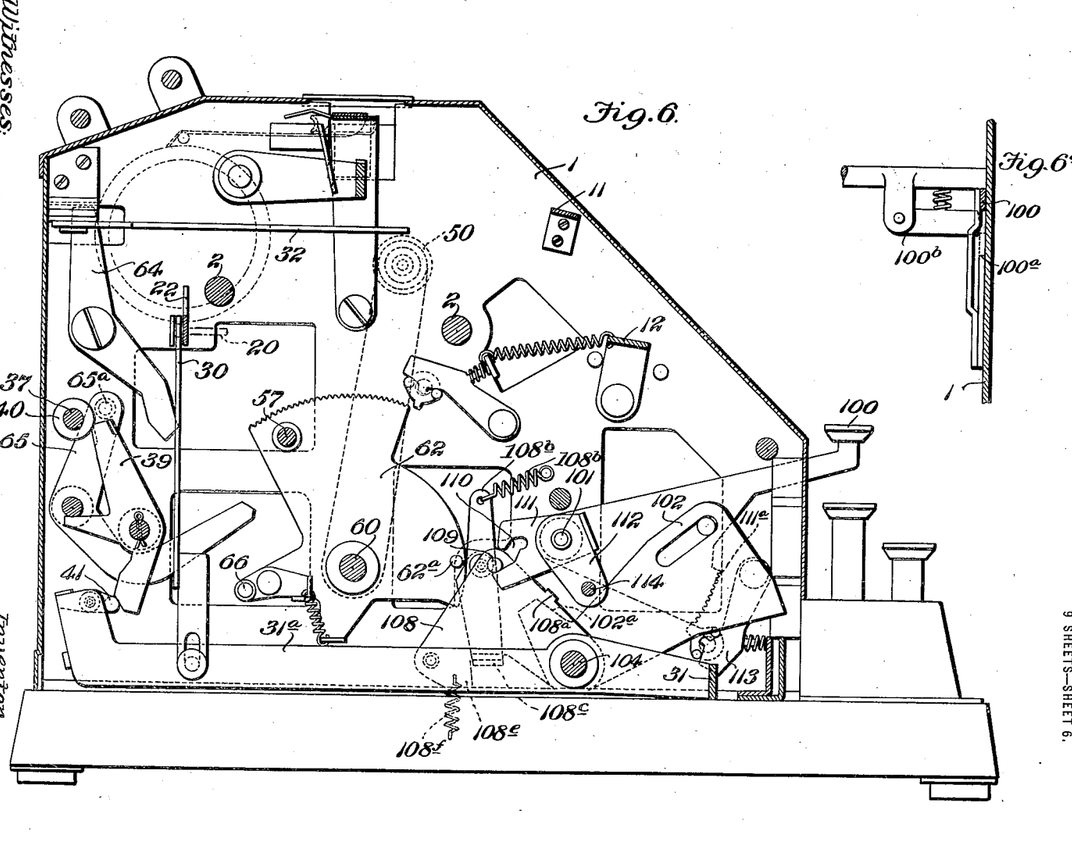
Fig. 6 is a view of the right hand side of the machine taken on line 6—6 of Fig. 7.
Figure 7:
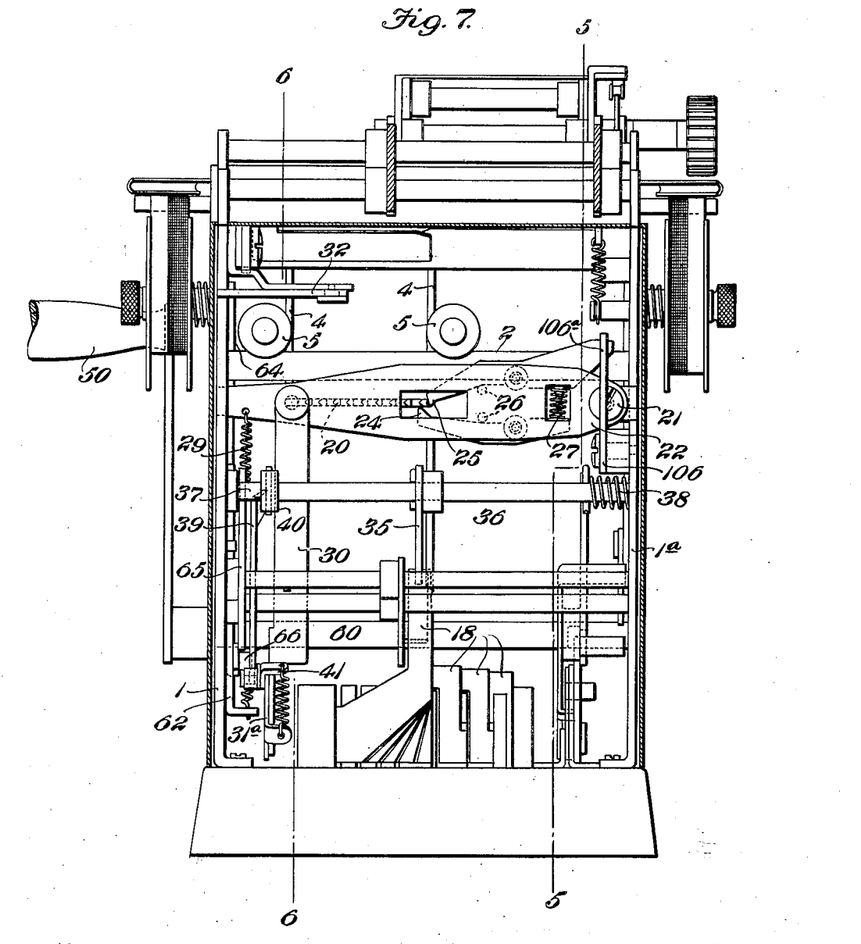
Fig. 7 is a rear elevation of the machine showing the escapement mechanism.

*The escapement.*—The escapement will best be understood by reference to Figs. 6 and 7. In the side frames 4 of the carriage is mounted the escapement rack 20. Pivoted to side frame 1ª at 21 is a vibrating lever 22 on which are pivoted pallets 24 and 25. The convergent movement of pallets 24 and 25 is limited by pins 26 and induced by spring 27. The free end of vibrating lever 22 is drawn downwardly by a spring 29. Vibrating lever 22 is oscillated on its pivot 21 by a link 30 which is operated from the universal bar 31. (See Figs. 5, 6 and 7.) Pallet 24 is a half step pallet and pallet 25 is a full step pallet. When a number key is depressed, vibrating lever 22 is raised so that half step pallet 24 engages one of the teeth of escapement rack 20. This permits the carriage to escape a half step, in which movement it will be remembered the segment held by zero stop 14 is rotated to set position against a number stop. Upon return of the depressed key, vibrating lever 22 returns downwardly withdrawing pallet 24 and interposing pallet 25. This permits the carriage to escape over the second half of the step, during which movement the segment in the setting zone passes into engagement with locking bar 12 and the next segment into engagement with zero stop 14. The carriage is moved leftward by a spring pressed lever 32 pivoted at 34 to the carriage side frame 4. (See Fig. 8ª.)

*Segment throwing mechanism.*—The segment throwing mechanism is to insure that the segment being set is given its full movement into engagement with the raised stop 18. It is operated in conjunction with the escapement mechanism and comprises the throwing lever 35 which is pinned to a sleeve 36 shifted longitudinally on shaft 37 against the influence of spring 38, Fig. 7. The lower edge of throwing lever 35 lies down over the stops 18 so that when a stop is raised, it throws throwing lever 35 upwardly. Throwing lever 35 has a portion 35ª which is adapted to coöperate with rollers 36ª carried on the segments 7 so that as lever 35 is raised it positively rotates the segment being set, and assists the spring 7ª of said segment in rotating the segment to the full extent permitted by the set stop. As the segment is moving leftward while it is rotating, it is necessary to move throwing lever 35 leftward with it and this is accomplished by a cam lever 39 (see Fig. 6) which coöperates with a cam 40 carried on the sleeve 36. Cam lever 39 is operated from lever 31ª of universal bar 31 by means of a tappet 41 and coöperates with cam 40 to shift sleeve 36 leftward against the influence of spring 38 (rightward as shown in Fig. 7) thus carrying throwing lever 35 along with the segment which is being set.

Figures 4, 4A:
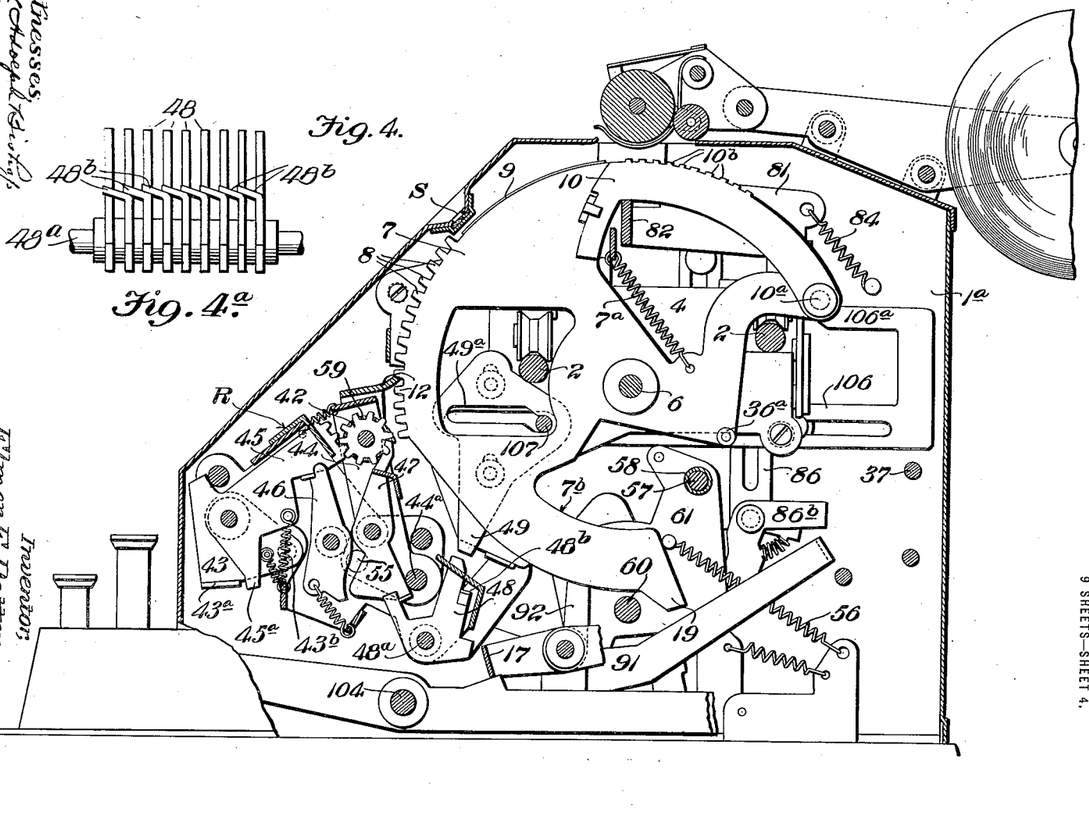

*Accumulating.*—It will be understood that as the segments are set and stepped over they come to proper denominational position in front of the accumulator wheels 42. The accumulator wheels are carried in a rock frame 44 which is pivoted at 44ª. They have a deferred carrying mechanism comprised of sectors 45, retaining pawls 46, and tripping pawls 47. Tripping pawls 47 also trip denominational carriage stops 48 to throw them forward out of the path of carriage stop 49. The denominational carriage stops 48 are pivoted on a shaft 48ª and are spaced apart from one another at distances corresponding to the spacing of the accumulator wheels. They are maintained in their normal position by gravity, but as stated, may be tripped or swung out of normal position by tripping pawls 47. As will be seen by reference to Fig. 4ª, each stop 48 has a laterally projecting finger 48ᵇ engaging the stop of the next lower denominational order. Consequently, no stop of a lower denominational order can be in normal position when a stop of a higher denominational order is in tripped position, as the fingers 48ᵇ form an interlocking arrangement whereby the position of stops of lower denominational orders are under the control of stops of higher denominational orders. The accumulators are rocked into mesh with the set segments by operation of operating handle 50 which rotates drive shaft 60 carrying driving cam 61. Loosely mounted on shaft 60 is a bell crank 51 carrying a dog 51ª which is adapted to engage a slot 61ª in cam 61 so that bell crank 51 will be swung with cam 61. Bell crank 51 has pivotal connection with a sliding bar 52 mounted on side frame 1ª. Sliding bar 52 has at its forward end a cam piece 54 which coöperates with a pin 55 projecting from register frame 44. Swinging bell crank 51 on the forward stroke of operating handle slides sliding bar 52 rearwardly, and cam piece 54 acting on pin 55 rocks the register frame over so that the totalizers mesh with the segments. The segments are restored to their normal position on shaft 6, and the amounts for which they were positioned inserted into the accumulator after the register frame has rocked into engagement with the segments. This return of the segments is accomplished by a bar 57 carrying rollers 58 which engage edges 7ᵇ of the segments. Bar 57 is carried by cam 61 and a second cam plate 62 carried by shaft 60. In the return to unset position, the teeth of the segments escape upwardly across locking bar 12.

As best shown in Fig. 4, each totalizer wheel has a conjoined cam 59 with which coöperates a tripping pawl 47, the nose of which lies in the cam notch when the totalizer is in zero position. Upon rotation of the totalizer from "9" to zero, the maximum thrust of its cam causes its tripping pawl 47 to trip its retaining pawl 46, permitting the carrying segment 45 of the next higher order to disengage from the shoulder of the retaining pawl. Further downward movement of the carrying segment is prevented by the engagement of its rearward end 45ª against a bar 43ª carried on a rock plate 43. Later, during the forward movement of the operating handle, pin 55 falls off the rear end of cam piece 54, permitting the register frame to rock back with the accumulator wheels in engagement with the carrying segments. Sliding plate 52 has a second cam piece 52ᵇ which coöperates with a pin 43ᵇ extending from rock plate 43. Soon after the engagement of pin 55 by cam piece 54, this pin 43ᵇ will have been engaged by the forward end of cam piece 52ᵇ, have passed over hump 52′, and thereafter, due to the engagement of bar 43ª with the ends 45ª of the carrying segments, the carrying segments 45 will be held elevated until pin 43ᵇ slides off the forward end of cam piece 52ᵇ. Thereupon, rocking plate 43 will rock downward under the influence of its spring, releasing such of the carrying segments 45 as have been tripped from their detaining pawls 46, and permit such tripped carrying segments 45 to move downward under the influence of their springs, thereby effecting the carrying into their accumulator wheels. This operation, of course, occurs subsequent to the time that pin 55 drops off the front end of cam piece 54, and therefore, while the accumulators are in engagement with the carrying segments. The carrying segments which have carried are restored early in the next operation of the handle after the totalizers have been swung away from the carrying segments and before the item segments are restored to normal position, when the little hump 52′ on cam piece 52ᵇ engages the pin 43ᵇ, rocking rock plate 43 and carrying the released carrying segments 45 upward until their detaining pawls 46 move back to engage them. Sliding bar 52 is returned forwardly by a spring 52ª. This movement does not affect the register frame nor the rock plate 43, for the reason that the beveled forward ends M of cam pieces 52ᵇ and 54 engage against the ends of pins 43ᵇ and 55, and cam sliding plate 52 over leftwardly toward side plate 1ª against the influence of spring 52ᵈ. This will be understood by reference to Fig. 5ᵇ.

The carriage is returned rightward by a retracting lever 64 which swings lever 32 rightward. Lever 64 is swung from operating shaft 60 through a lever 65 carrying a roller 65ª which coöperates with the lower end of lever 64. The lever 65 is swung on the rearward movement of the handle by a tappet 66 on cam plate 62.

*Printing.*—Pivoted at 80 in the side frame is the printing hammer 81 having a striking bar 82 which lies under the type carriers 10. A spring 84 (see Fig. 5) tends to throw striking bar 82 upward against the type carriers 10, and upward movement of said striking bar is limited by a lug 85 on the side frame. Slidably mounted on side frame 1ª is a vertically sliding bar 86 which upon the first part of the forward movement of the handle is carried upward by the engagement of lug 61ᵇ of operating cam 61 with the depending arm of a bell crank 86ᵇ. Sliding bar 86 has a rearward extension 86ª on which is pivoted a tappet 87 under the influence of compression spring 88. Tappet 87 engages beneath a lug 89 on the rear end of the pivot arm 81 of the printing hammer, so that as sliding bar 86 is carried upward, said rear arm will be swung upward and striking bar 82 downward, thus "cocking" the hammer against the influence of spring 84. Upon sufficient upward movement of sliding bar 86 the lug 89 slips off of the nose of tappet 87 and spring 84 throws striking bar 82 up sharply against the type carriers, and the impact of the blow throws them upwardly against the ribbon, printing the numbers which are positioned on the printing line. Segments which have not been set do not have their type carriers actuated for the reason that the right hand half of striking bar 82 is cut down, as best illustrated in Fig. 4, so that only the type carriers of set segments are struck.

Figure 9:
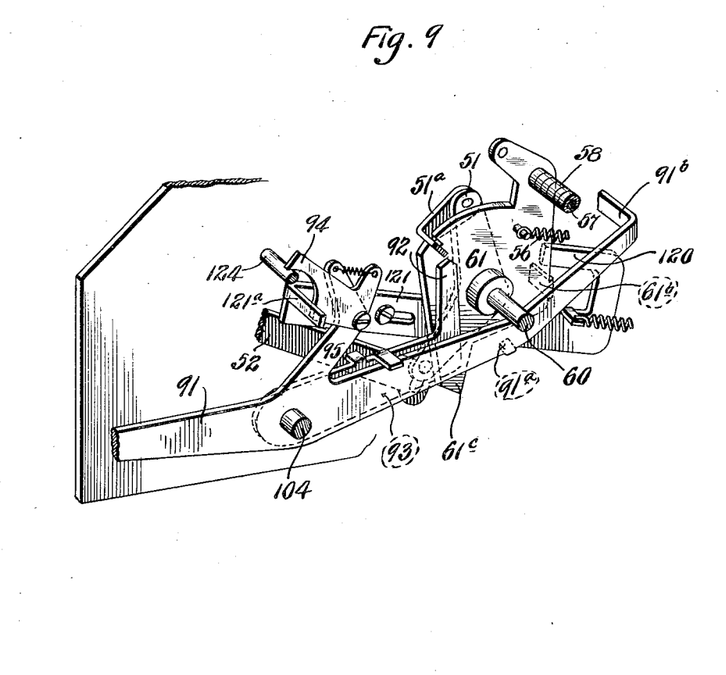
Fig. 9 is a detail illustrating the error key and connections.

*The error key.*—As heretofore explained, the shifting of the accumulator wheels into engagement with the segments is accomplished by the swinging of bell crank lever 51 by operating cam 61 by virtue of detent 51ª. In case an error in setting up is made, it is necessary to operate the handle in order to return the set segments to unset position. Therefore, means must be provided to disengage the operating cam 61 from the register frame so that such incorrect number will not be added in the totalizers. This is accomplished by the error key 90, from the lever 91 of which is operated an auxiliary lever 93 provided at its rearward end with an upstanding finger 92 which is adapted to coöperate with dog 51ª to move the same out of the notch in operating cam 61. Consequently, when the handle is pulled, the accumulator wheels will not be shifted into engagement with the segments, although the segments will be returned to zero position by the swinging of operating cam 61, as above explained. Means for compelling a full stroke of the error key before the operating handle can be pulled is provided, and consists in the tappet 94 mounted on the upstanding arm 95 of error key lever 91. A forwardly projecting finger of tappet 94 rests on the rod 124 and is adapted to engage behind the transversely extending end 121ª of latch plate 121. Consequently, upon slight depression of the error key, latch plate 121 is moved so that its rear end engages the lug 61ᵇ of operating cam 61, thereby locking the driving shaft and operating handle against movement. Upon the full stroke of error key 90, however, tappet 94 is cammed by rod 124 out from behind the transversely extending portion 121ª of latch plate 121, which permits the latch plate 121 to return rearwardly under the influence of spring 126 and release operating cam 61.

Means is provided for holding the error key depressed and the accumulators out of mesh with the segments while the segments are being returned to unset position by operation of the handle. On the rear portion of the error key lever 91 is a transversely extending lug 91ª which is designed to coöperate with a notch in the front of a detent lever 149 which is pivoted at 149ª and pressed toward said lug 91ª by spring 149ᵇ. Consequently, when the error key is depressed, the lug 91ª will be lifted until it will be engaged by the notch in said detent lever 149, and by this means detent 51ª will be held out of engagement with plate 61 until the completion of the forward stroke of the handle which returns the segments to unset position. At the end of the forward stroke of the handle, the depending portion 61ᶜ of plate 61 will engage a laterally extending ear 149ᶜ on detent lever 149, and swing said lever rearwardly to disengage lug 91ª. Printing of an item while the error key is depressed is prevented by the rear end 91ᵇ of the error key lever, which engages the laterally extending arm of bell crank 86ᵇ on the lower end of sliding bar 86, and rocking said bell crank on its pivot, swings its depending arm from over lug 61ᵇ, so that sliding bar 86 will not be shifted upwardly to actuate the printing hammers when the handle is pulled.

*The total key.*—Total key 100 (see Fig. 6) is pivoted at 101 on side frame 1. Operation of total key 100 accomplishes four things. First, it lowers carriage stop 49 so that it will engage the first denominational stop 48 which has not been swung out of its path by a tripping pawl 47. This is accomplished by the forward movement of releasing bar 106 carrying a shaft 107, which, operating in a slot 49ª of carriage stop 49 cams said stop downwardly. Second, it releases the segment carriage to permit its escape leftward into proper position in front of the accumulators. Third, it throws the accumulators into engagement with the segments and locking bar 12 out of engagement therewith. Fourth, it locks the operating handle against movement until a full down stroke of the total key is accomplished. The second effect, that of releasing the carriage to allow its escapement, is accomplished through a plate 102 which is pinned to shaft 104 so as to swing with the rotation of said shaft. At the opposite end of shaft 104 (Fig. 5) is an arm 105 which is pivoted at its upper end to releasing bar 106 slidably mounted on side frame 1ª. Releasing bar 106 has a wedging finger 106ᵃ at its rearward end which coöperates with the rear end of full step pallet 25. Consequently, upon depression of total key 100, plate 102 swings shaft 104 which slides releasing bar 106 forward and cams pallet 25 out of engagement with escapement rack 30, thus permitting the segment carriage to escape over to the extent permitted by the denominational escapement stop 48 in the path of carriage stop 49. At the side of plate 102 is plate 108 which is loosely mounted on shaft 104 and has a laterally projecting lug 108ᵃ lying in the path of an arm 102ᵃ of plate 102. By this means plate 108 is swung upwardly upon depression of total key 100. Plate 108 carries a pin 109 which operates in a cam slot 110 in a cam 111 which is pivoted at 101 and carries an arm 112 carrying a pin 114 connected to the register rock frame. The swinging of plate 108 upwardly, by virtue of the operation of pin 109 in cam slot 110, swings arm 112 and pin 114 forwardly, rocking the register frame 44 so that the accumulators are thrown into mesh with the segments. At the end of the upward movement of plate 108, pin 109 comes to rest in the inner end of slot 110, and a latching lever 108ᵇ which is pivoted on side frame 1 and has a laterally projecting end 108ᶜ, swings under the influence of its spring 108ᵈ so that the laterally projecting end 108ᶜ engages under the end 108ᵉ of plate 108, locking it in its upward position and the register wheels in engagement with the segments. The interval between the time when plate 102 starts to move and the time when its end 102ᵃ engages lug 108ᵃ, gives time for the segment carriage to escape over in front of the accumulators before the register frame is locked by the movement of plate 108 and cam 111. Total key 100 is held locked in its depressed position by latch plate 123 which engages a lug 123ᵃ on sliding plate 106 when said sliding plate is moved forward by rotation of shaft 104. The completion of the stroke of total key 100 moves a lug 106ᵇ on sliding bar 106 against movable lock bar 12 and pushes it out of engagement with the segment teeth so that the segments may be permitted to escape downwardly in mesh with the accumulator wheels to the extent of movement permitted by the cams 59. It is obvious that this movement will be continued until the accumulator wheels are returned to zero, in which position, they are stopped by the engagement of tripping pawls 47 with the cams. When the accumulators are thus returned to zero position, each sector will have moved downwardly to an extent corresponding to the number at which its accumulator wheel stood, and the total will thus be made to appear through the sight opening, and the type levers will have been positioned with the type to print the total on the printing line.

All of the parts are restored to normal position by the operation of the operating handle as follows: First—A pin 62ᵃ which is carried by plate 62 swung by the handle will engage the shoulder of latch lever 108ᵇ and throw the end 108ᶜ of said lever out from under the end 108ᵃ of plate 108, allowing plate 108 to fall under the influence of its spring 108ᶠ. This movement of plate 108, due to the engagement of pin 109 in slot 110, will swing cam 111 and arm 112 so as to disengage the accumulators from the segments. Almost simultaneously with this operation, pin 103ᵇ on drive cam 61 will engage latch plate 123 and cam it upward to release sliding plate 106 which is returned rearwardly by spring 105ᵃ which is attached to a rearwardly extending arm of arm 105. Then rollers 58 will engage the segments and during the remainder of the forward stroke of the handle return them to unset position.

Figures 3, 3A:
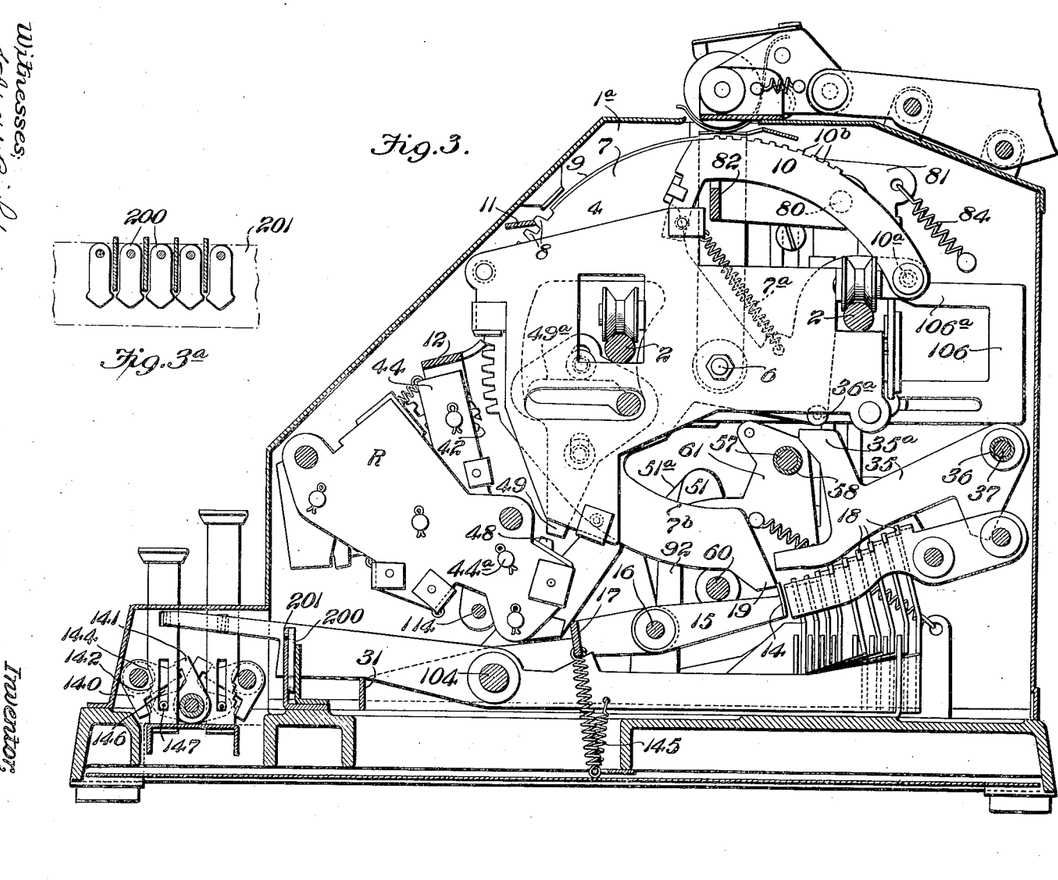

*The number key full stroke mechanism.*— The number keys are provided with any of the well known forms of mechanism whereby depression of more than one key at a time is prevented. One well known form is illustrated in Fig. 3ᵃ, the same comprising a series of pivoted pallets 200 which are mounted on the comb plate 201. The sides of these pallets are adapted to contact with one another so that when one of the pallets is swung, the others of the series will also be swung to place a portion thereof in the path of the key levers. There is enough movement between the pallets to permit the passage of a single key lever between two of them. This forces the other pallets together to prevent depression of any other key lever.

Universal bar 31 is losely mounted on shaft 104, and extends below all of the number key levers, so that whenever a number key is depressed, the front end of the universal bar will be swung downwardly and its rear end upwardly. Universal bar 31 carries a swinging arm 31ᵇ which rotates upon shaft 104 as a center, and which engages at its upper end the lateral transversely extending end 121ᵃ of latch plate 121, so that whenever a number key is depressed, latch plate 121 will be moved so that its rearward extension 120 will engage lug 61ᵇ to prevent rotation of the power shaft until the depressed key has returned to normal position. Each number key is provided with a full stroke mechanism, best illustrated in Fig. 3, the same comprising a detent 140 and a latching detent 141. The lower ends of the number key shafts are provided with notches 142 and are inset from the point 144. A detent 140 coöperates at one end with each key shaft, and at the other end with the associated latching detent 141. The detent 140 is adapted to coöperate with the notches 142 to prevent return of the key is depressed to the extent that the point of has been started. However, when the key is depressed to the extent that the point 144 engages the coöperating end of the detent 140, said detent 140 will be swung until the coöperating nose of latching detent 141 engages over its rearward end, thereby holding its forward end out of coöperation with the key shaft, and permitting the return of the key under the influence of its spring 145. When the key is almost returned to normal position, the end of a slot 146 in the shaft thereof will engage a pin 147 upon an arm of the latching detent 141, swinging said latching detent out of coöperation with detent 140, so that the latter is disengaged and permitted to return into coöperation with the key shaft. By virtue of the coöperation of this full stroke mechanism with the locking mechanism comprising the parts 31$^b$, 121, 121$^a$, and 61$^b$, it is impossible to operate the power shaft of the machine with any of the number keys in other than normal position.

*Total key full stroke and handle locking mechanism.*—The full stroke mechanism for the total key 100 comprises the ratchet toothed portions 111$^a$ and the ratchet 113, which coöperates therewith to prevent return of the key before a full stroke has been completed. The handle 50 is locked between the time when a stroke of total key 100 is started and completed by the latch plate 121, whose rear end 120 is drawn over the lug 61$^b$ on plate 61. Latch plate 121 is operated from the total key by means of the tripping plate 103 which is pivoted on arm 105, and functions in the same fashion as does plate 94. Tripping plate 103 has a shoulder which engages behind the laterally extending projection 121$^a$ on latch plate 121, and a finger portion which engages over shaft 124. Consequently, when depression of total key 100 is started and arm 105 swung forwardly thereby, latch plate 121 will be shifted forward by tripping plate 103 to projecting portion 120 over lug 61$^b$. At the completion of the downward stroke of total key 100, however, tripping plate 103 will be cammed from behind the lateral projection 121$^a$ by virtue of the camming action of rod 124 on the finger of plate 103. Thereupon latch plate 121 will be released to move rearward under the influence of its spring 126, releasing plate 61 to permit operation of the handle.

In order to hold locking bar 12 out of engagement with the segment teeth while the segments are escaping downwardly to clear the accumulator wheels at the taking of a total, it is necessary to hold releasing bar 106 in its forward position, in which position lug 106$^b$ is in engagement with locking bar 12. To this end is provided the latch 123 which is pivoted on side frame 1$^a$, and which is adapted to engage a lug 123$^a$ on releasing bar 106 when said releasing bar is shifted forwardly. This holds releasing bar 106 in its forward position and total key 100 is depressed. When the operating handle is first pulled the operation of the printing hammers will be accomplished by lug 61$^b$ actuating sliding bar 86 as above described. Thereafter latch 123 will be cammed up from behind lug 123$^a$ by roller 123$^b$ carried on plate 61. Subsequently, the segments will be returned to unset position by the rollers 58 as above described.

As it may be desirable to print the total in red, means is provided for shifting the ribbon when a total is printed. This comprises the vibrating frame 150 upon which is carried a bi-colored ribbon N. In the vibrating frame is a pin 150$^a$ which lies in the path of a finger 106$^c$ on releasing bar 106. When releasing bar 106 is shifted forwardly by operation of the total key, finger 106$^c$ engages pin 150$^a$ and swings vibrating frame 150 forward, thereby positioning the red portion of the bi-colored ribbon on the printing line.

Figures 8, 8A, 8B:
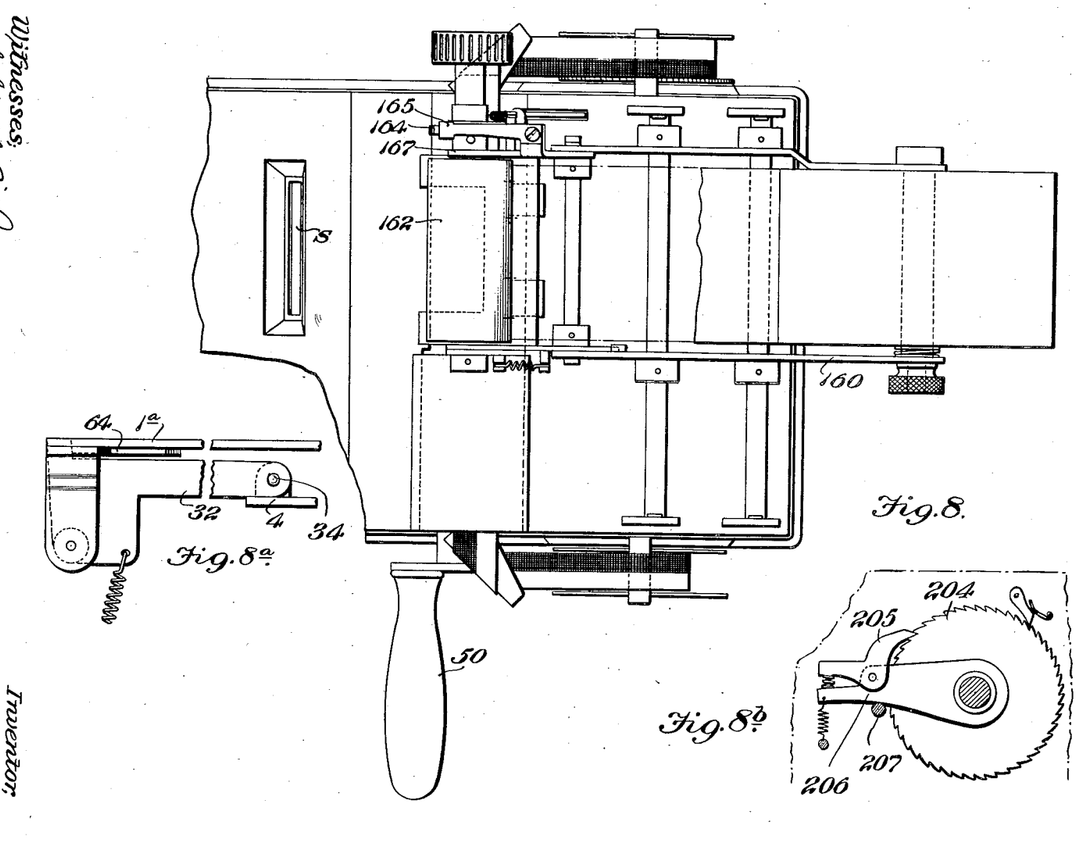

*Paper feeding mechanism.*—The operation of the paper feeding mechanism will be understood from Figs. 3, 5 and 8. The paper roll is carried on a support 160 and fed therefrom between feed roll 161 and platen 162. On the platen shaft is mounted a ratchet 164 which is held by a detent 165 and actuated by a dog 166 carried on a swinging plate 167. Swinging plate 167 is actuated by a lever 168 which is mounted on side frame 1$^a$ and which is swung by the printing hammer 81. Whenever lever 168 is so swung it actuates plate 167 and feeds the paper by rotating platen 162.

In Fig. 6$^a$ is illustrated a feature for influencing the operation of the total key 100 so as to insure the carriage stepping over completely in front of the proper totalizers before the lock bar 12 is operated to release the segments. In the path of the lever of the total key 100 is interposed a stop 100$^a$ which causes the operation of the total key to stop for an instant after it has been depressed sufficiently to release the carriage. The pressure upon the total key, however, causes the key lever to slip leftwardly off of the stop 100$^a$ so that the stroke may be completed. The detent 100$^b$ insures the key lever coming into engagement with the stop 100$^a$, but permits direct return of the key lever on the upward stroke.

*Ribbon feeding mechanism.*—The ribbon feeding mechanism is illustrated in Fig. 8$^b$. The left hand ribbon spool is provided with a ratchet wheel 204 with which coöperates a dog 205 carried on a swinging arm 206. A pin 207 which is mounted on sliding bar 86 projects through side frame 1ª in position to swing arm 206 upward whenever sliding bar 86 is raised. When arm 206 is thus swung, it rotates the ribbon spool and feeds the ribbon.

From the foregoing, it is obvious that the various improvements which I claim as my invention provide a very compact and simple accumulating and listing machine having among other novel features a new and improved form of item carriers; a new and improved item setting mechanism; a new and improved denominational stop mechanism for the differential item carriers; a new and improved full stroke mechanism for number keys; a new and improved mechanism for shifting various parts in taking a total; and a new and improved general arrangement of parts.

While I have shown herein a single embodiment of my invention, it is evident that many changes can be made in the structure within the scope of the appended claims without departing from the spirit thereof.

What I claim is:

1. In a computing machine, the combination of a revoluble item segment mounted for denominational movement, key-operated stops for positioning said segment to indicate a number, keys for operating said stops, and means operable by said keys for revolving said segment, said means being movable laterally in unison with the denominational movement of said segment for the purpose described.

2. In a calculating machine, the combination of a revoluble item segment mounted for denominational movement, stops for limiting the revoluble movement of said segment, means for stepping said segment laterally, and a throwing lever operable by said stops and adapted to rotate said segment, said throwing lever being movable laterally with said segment.

3. In a calculating machine, the combination of item carriers mounted for denominational movement, locking bars for holding said item carriers in unset and set positions, number stops adapted to coöperate with each of said item carriers when it is intermediate said locking bars, keys for operating said number stops to render them effective, and an intermediate stop adapted to limit movement of an item carrier when it is intermediate said locking bars, said intermediate stop being operable from said numeral keys.

4. In a calculating machine, the combination of item carriers mounted for independent movement in one direction and simultaneous denominational movement in another direction, a locking bar for holding said item carriers in unset position, a locking bar for holding said item carriers in set position, an intermediate stop effective upon said item carriers intermediate said locking bars, means for stepping said item carriers successively from the control of said first mentioned locking bar to the control of said intermediate stop, and from the control of said intermediate stop to the control of said second mentioned locking bar, means for releasing said item carriers from said intermediate stop, and number stops adapted to limit the movement of said item carriers when so released.

5. In a calculating machine, the combination of a denominationally movable carriage carrying item carriers, means for stepping said carriage for denominational movement, denominationally arranged accumulator wheels adapted to be actuated by said item carriers, a denominational stop under the control of each of said accumulator wheels, and a stop mounted on said carriage and adapted to coöperate with said denominational stops to limit the denominational movement of said item carriers relative to said accumulator wheels.

6. In a calculating machine, the combination of a laterally movable carriage carrying item carriers, means for positioning said item carriers individually, denominationally arranged accumulator wheels adapted to be actuated by said item carriers, a denominational stop under the control of each item wheel, means for releasing said carriage to permit its movement relative to said item wheels, and a stop operable by said means and adapted to coöperate with said denominational stops to limit the movement of said carriage.

7. In a calculating machine, the combination of item carriers, a register frame carrying accumulator wheels adapted to coöperate with said item carriers, an operating handle, a cam plate operable therefrom, printing mechanism operable from said cam plate, shifting mechanism operable from said cam plate for shifting said register frame to engage said accumulator wheels with said item carriers, a disengaging member adapted to render said cam plate ineffective upon said shifting means, a manually manipulative means adapted to operate said disengaging member and to render said cam plate ineffective upon said printing mechanism, and a second manually manipulative means adapted to operate said disengaging member without rendering said cam plate ineffective upon said printing mechanism.

8. In a computing machine, the combination of a denominationally movable carriage, a plurality of item segments carried thereby, key-operated stops adapted for positioning said segments in denominational sequence, keys for operating said stops, and means operable by said keys for revolving said segments; said means coöperating with said segments in denominational sequence and being movable laterally in unison with the movement of the carriage.

9. In a calculating machine, the combination of a laterally movable carriage, item carriers carried thereby, a register adapted to coöperate with said item carriers, locking means for holding said item carriers in set positions, an escapement mechanism for said laterally movable carriage, a total key, and a releasing bar operable thereby; said releasing bar being adapted upon operation of said key to release said carriage from its escapement mechanism, and subsequently releasing said item carriers from said locking means.

10. In a calculator, the combination of laterally movable segments having type carriers, means for setting said segments to indicate numbers, a printing hammer adapted to coöperate with the type carriers of set segments, an operating handle, a swinging plate operable thereby, a sliding plate provided with means adapted to coöperate with said printing hammer and a movable member adapted to coöperate with said swinging plate, an error key, and means operable thereby for affecting said movable member to render said swinging plate ineffective upon said sliding bar.

11. In a calculating machine, the combination of an item carrier, a totalizer, a means including an operating shaft adapted to render said item carrier effective upon said totalizer, a slidable latch plate, a manually manipulative means, and means operable thereby for moving said latch plate to lock said operating shaft against rotation.

12. In a calculating machine, a denominationally movable carriage, item carriers carried thereby, accumulators with which said item carriers are adapted to coöperate, denominational stops operable by said accumulators, a stop carried by said carriage, and means for moving said stop into the plane of said denominational stops.

13. In a calculator, the combination of a denominationally movable carriage, item carriers carried thereby, a plurality of accumulator wheels, a plurality of denominational stops adapted to limit the movement of said carriage, and means operable by rotation of said accumulators for moving said stops out of operative position.

14. In a calculator, the combination of a denominationally movable carriage, item carriers carried thereby, accumulator wheels adapted to coöperate with said item carriers, a denominational stop associated with each of said accumulator wheels and adapted to limit the movement of said carriage, and means operable by each of said accumulator wheels for operating its associated denominational stop.

15. In a calculator, the combination of a laterally movable carriage carrying item carriers, an escapement mechanism therefor, means for impelling lateral movement of said carriage, said means comprising a spring pressed lever, an operating handle adapted to return set item carriers to unset position, and means for returning said carriage to normal position, said means including a lever adapted to swing said spring pressed lever against the influence of its spring and means swung by said operating handle adapted to actuate said last mentioned lever.

16. In a calculator including an operating shaft, a means for locking said shaft against operation, said means including a latch plate adapted to engage an arm of said shaft to hold the shaft against rotation, a manually manipulative means, an arm swung thereby, a tappet carried by said arm and adapted to move said latch plate when said arm is swung in one direction, and a member engaging said tappet and adapted to cam the same from engagement with said latch plate upon a predetermined movement of said arm.

17. In a calculator including an operating shaft and number-setting devices, a means for locking said shaft during certain movements of said number-setting devices, said means including a latch plate adapted to engage an arm of said shaft to hold the shaft against movement, a swinging arm adapted to actuate said latch plate and universally operable from said number-setting devices, and a full stroke mechanism adapted to preclude return of said number-setting devices until a full stroke thereof has been completed.

18. In a calculator including an operating shaft, item carriers, and a register, a means for rocking said register into coöperation with said item carriers, said means including a driving cam operable from the operating shaft, a sliding plate adapted to engage the register to move the same into coöperation with the item carriers, a lever whereby said sliding plate is actuated from said driving cam, and a dog whereby said lever is actuated from said driving cam, said dog being disengageable from said driving cam whereby to render the latter ineffective upon said sliding plate.

19. In a calculator, the combination of laterally movable item carriers, manually manipulative number-setting devices adapted to affect said item carriers, a laterally movable throwing mechanism adapted to move said item carriers to set positions, a bar universally operable from said number-setting devices, and means operated by said bar for moving said throwing mechanism in unison with the lateral movement of the item carriers.

20. In a calculator, the combination of laterally movable item carriers, stops for determining the setting of said item carriers, keys for operating said stops, throwing mechanism actuated by said stops and adapted to move said item carriers to set positions, and means operable from said keys adapted to move said throwing mechanism laterally with said item carriers.

21. In a calculator including manually manipulative keys, a full stroke mechanism for each of said keys, the same comprising a key shaft provided with notches, a detent having its nose adapted to coöperate with the notches in said shank to prevent return of the key, a latching detent adapted to coöperate with the tail of said first mentioned detent to hold its nose out of coöperation with said notches upon the completion of the stroke of the key, and means for moving said latching detent out of coöperation with said first mentioned detent upon the complete return of the key.

22. In a calculator, the combination of laterally movable item carriers, a locking bar adapted to hold said item carriers in unset position, means for moving said item carriers to selective set positions, a locking bar adapted to hold said item carriers in said set positions, a register adapted to coöperate with said item carriers, and means adapted to return said item carriers to unset position; said last mentioned locking bar being adapted to permit the escape of said item carriers during their return movement to unset position.

23. In a calculator in combination with amount-setting devices, a plurality of type carriers carrying printing type, said type carriers being mounted for collective lateral movement and for independent orbital and pivotal movements, means for imparting lateral and orbital movements to said type carriers whereby to selectively position the type carried by them, and means for imparting pivotal movement to selected type carriers whereby to print from the type so positioned; said type carriers being movable into coöperative relationship with said last mentioned means by their lateral movement.

24. In a calculator including accumulator wheels, denominational stops operable from said accumulator wheels, a denominationally movable carriage, type carriers carried thereby, means for imparting denominational movement to said carriage, means on said carriage adapted to coöperate with said denominational stops to limit the denominational movement of said carriage, and means for printing from said type carriers numbers corresponding to the amounts set up in said accumulator wheels.

25. In a calculator in combination, a laterally movable carriage, a plurality of item carriers carried thereby, means for positioning said item carriers in positions significant of numbers, a plurality of type carriers carried by said carriage and mounted for longitudinal movement thereon, one of said type carriers being associated with each of said item carriers, and means for imparting movement to said type carriers whereby to print therefrom numbers indicative of the significant positions of their associated item carriers; said type carriers being movable into coöperative relationship with said last mentioned means by lateral movement of the carriage.

26. In a calculating machine the combination of an accumulator having a plurality of denominationally arranged accumulator wheels, an item segment provided with means for actuating any of said accumulator wheels and mounted for denominational movement relative thereto, means for moving said segment to positions significant of digital numbers, a type carrier mounted on said segment and having printing movement independently of the movements of said segment, number type carried by said type carrier, an actuator for said type carrier adapted to actuate the same to print from the type thereon, said actuator being so correlated with said accumulator and said type carrier as to be effective upon the latter only when said segment has been positioned for coöperation with one of said accumulator wheels by denominational movement of said segment.

27. In a calculating machine including accumulator wheels, denominational stops operable from said accumulator wheels, a denominational carriage, and means on said carriage adapted to coöperate with said denominational stops to limit the denominational movement of said carriage.

28. In a calculating machine including accumulator wheels, denominational stops operable from said accumulator wheels, a denominationally movable carriage, denominationally arranged series of type carried on said carriage, means for printing from said type, and means on said carriage adapted to coöperate with said denominational stops to limit the denominational movement of said carriage.

29. In a calculating machine including accumulator wheels, denominational stops operable from said accumulator wheels, a denominationally movable carriage, denominationally arranged indicators mounted thereon, and means on said carriage adapted to coöperate with said denominational stops to limit the denominational movement of said carriage.

30. In an adding and listing machine, an accumulator including a plurality of denominationally arranged accumulator wheels, a plurality of denominationally movable item carriers adapted to coöperate with said accumulator wheels to set amounts therein, means for positioning said item carriers under control of said accumulator wheels to indicate a total contained in said accumulator, and means for operating said item carriers to print said total.

31. In a listing and adding machine, the combination of an accumulator comprising a plurality of accumulator wheels, a denominationally movable number carrier including a plurality of individually movable number segments arranged denominationally, means for operating said number carrier to set numbers in said accumulator, printing type carried on said number segments, means for bringing said number segments while in unset positions into coöperative engagement with accumulator wheels, means for releasing said number segments while so engaged to permit their clearing the accumulator wheels, and means for printing from said type while it is in position determined by said clearing operation.

In testimony whereof I hereunto affix my signature in the presence of two witnesses, this 9th day of March, 1914.

ELMER E. PATTEN.

Witnesses:
  M. P. SMITH,
  M. A. HANDEL.